United States Patent
Tunguz-Zawislak

(10) Patent No.: US 9,131,273 B1
(45) Date of Patent: Sep. 8, 2015

(54) SYNCHRONIZED PROGRAMMING

(75) Inventor: Tomasz J. Tunguz-Zawislak, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1226 days.

(21) Appl. No.: 12/252,728

(22) Filed: Oct. 16, 2008

(51) Int. Cl.
*H04N 21/45* (2011.01)
*H04N 21/81* (2011.01)
*G06Q 30/02* (2012.01)

(52) U.S. Cl.
CPC ....... *H04N 21/4532* (2013.01); *G06Q 30/0251* (2013.01); *H04N 21/812* (2013.01)

(58) Field of Classification Search
CPC .......... G06Q 30/0251; H04N 21/4532; H04N 21/812
USPC ...................... 725/114, 32, 35, 153
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,330,595 B1 * | 12/2001 | Ullman et al. | 709/219 |
| 6,401,075 B1 | 6/2002 | Mason et al. | |
| 6,567,984 B1 * | 5/2003 | Allport | 725/110 |
| 6,708,335 B1 * | 3/2004 | Ozer et al. | 725/20 |
| 6,985,882 B1 | 1/2006 | Del Sesto | |
| 7,039,599 B2 | 5/2006 | Merriman | |
| 7,136,875 B2 | 11/2006 | Anderson et al. | |
| 7,805,373 B1 * | 9/2010 | Issa et al. | 705/51 |
| 2002/0166127 A1 * | 11/2002 | Hamano et al. | 725/105 |
| 2005/0251820 A1 * | 11/2005 | Stefanik et al. | 725/34 |
| 2007/0157228 A1 * | 7/2007 | Bayer et al. | 725/34 |
| 2007/0239522 A1 * | 10/2007 | Kunz et al. | 705/14 |
| 2007/0244750 A1 * | 10/2007 | Grannan et al. | 705/14 |
| 2008/0201731 A1 * | 8/2008 | Howcroft | 725/13 |
| 2009/0037949 A1 * | 2/2009 | Birch | 725/34 |
| 2009/0049469 A1 * | 2/2009 | Small et al. | 725/35 |
| 2009/0172728 A1 * | 7/2009 | Shkedi et al. | 725/34 |
| 2009/0327894 A1 * | 12/2009 | Rakib et al. | 715/719 |

(Continued)

FOREIGN PATENT DOCUMENTS

WO    WO 97/21183    6/1997

OTHER PUBLICATIONS

Reexamination of U.S. Appl. No. 95/001,073, filed Sep. 30, 2004, Stone et al.

(Continued)

*Primary Examiner* — Nicholas Corbo
*Assistant Examiner* — Alexander Q Huerta
(74) *Attorney, Agent, or Firm* — Fish & Richardson P.C.

(57) ABSTRACT

Information about current television programming and web access by a user can be used to select and deliver ads or content to a television of the user or a computer of the user (e.g., the ads or content can be displayed through a web browser). Additional information (e.g., geographical location or demographics of the user) can also be used in the selection of ads or content to be delivered to the television or computer.

41 Claims, 4 Drawing Sheets

(56) References Cited

U.S. PATENT DOCUMENTS

2010/0211464 A1* 8/2010 Zhu et al. .................. 705/14.53
2013/0276023 A1* 10/2013 Kent et al. ...................... 725/34

OTHER PUBLICATIONS

Reexamination of U.S. Appl. No. 95/001,061, filed Sep. 3, 2002, Stone et al.
Reexamination of U.S. Appl. No. 95/001,069, filed Jul. 11, 2002, Dean et al.
Reexamination of U.S. Appl. No. 95/001,068, filed Dec. 7, 2002, Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.

* cited by examiner

US 9,131,273 B1

SYNCHRONIZED PROGRAMMING

TECHNICAL FIELD

This document generally relates to information management.

BACKGROUND

Televisions and computers can both provide a wealth of information. For example, a viewer can watch news events on the television and then use a computer to search the Internet to find more in-depth analyses of the news events. A viewer can watch sports programs on television, and then use the computer to find articles on the Internet having detailed information about, for example, the players, score statistics, and upcoming game schedules. In addition, using a computer that is connected to the Internet through a network router, a user can watch television programs while surfing the Internet.

SUMMARY

This document describes a system for collecting information related to television programming and web access by a user and using the collected information to provide content to a television or to a web browser viewed by the user.

In general, in one aspect, a first information related to programming being viewed on a first device is received; a second information related to a web page that is being accessed through a second device is received, the first and second devices being associated with a user; and content (e.g., on a web page) is delivered to the user, in which the content is determined based on the first and second information.

Implementations may include one or more of the following features. The first device can include a television, tuner, set-top box, computer, or video game console and the second device can include a computing device (e.g., a laptop computer, a cell phone). The programming can include at least one of a video, an image, a movie, a game, or a television show. The first information can include at least one of an episode content, a channel identifier, or a number of times a user changes channels, or a rate at which the user changes programming. The programming can include at least one of a video, an image, a movie, or a television show. The second information can include at least one of a uniform resource locator (URL), a web cookie, or programming-related advertisements.

The provided content can be selected by comparing the first and the second information to stored values. The provided content can be selected by an overlap in information between the first and the second information. The content can include at least one of a feature or an advertisement. The feature or the advertisement can be related to programming. A third information about the user can be transmitted, and content can be received (e.g., on the web page) that is determined based on the first, second, and third information. The third information can include at least one of a geographical location of the user, demographics of the user, or a number of computers in the user's household.

The programming and the web page can be transmitted to a third device at the user's site and the third device can send the television programming to the first device and send the web page to the second device. The programming and the web page can be transmitted to a third device, which can be a cable modem, a network router, or a set-top box. The first and second information can be received from the third device.

The programming can be broadcast using at least one of a television over Internet protocol, National Television System Committee (NTSC) standard, Advanced Television Systems Committee (ATSC) standard, Digital Video Broadcasting (DVB) standard, or Integrated Services Digital Broadcasting (ISDB) standard.

The content can include at least one of a television program, a video, a game, an advertisement, or a web page.

In general, in another aspect, a first information is transmitted from a router to a remote server, the first information being related to programming being viewed by a user on a first device; a second information is transmitted from a router to the remote server, the second information being related to a web page that is accessed at a second device, the first and second devices being associated with a user; a content that is selected based on the first and second information is received, and the content is provided to a television or a web browser executing on a computer.

Implementations may include one or more of the following features. The first device can include a television, a computer, or a video game console and the second device can include a computer or a cell phone. The first information can include at least one of an episode content, a channel identifier, or a number of times a user changes channels, or a rate at which the user changes programming. The programming can include at least one of a video, an image, a movie, a game, or a television show. The second information can include a uniform resource locator (URL), a web cookie, or programming-related advertisements.

The provided content can be selected by comparing the first and the second information to stored values. The provided content can be selected by an overlap in information between the first and the second information. The content can include a feature or an advertisement. The feature or the advertisement can be related to programming.

A third information about the user can be transmitted to the remote server. The third information can include a geographical location of the user, demographics of the user, or a number of computers in the user's household. Receiving the content can include receiving content that is determined based on the first, second, and third information.

In general, in another aspect, a server receives a first information related to television programming being viewed on a first device, receives a second information related to a web page being accessed through a second device, the first and second devices being associated with a user, identifies content based on the first and second information, and delivers the content to the first or second device.

Implementations may include one or more of the following features. The first device can include a television, a computer, or a video game console and the second device can include a computer or a cell phone. The first information can include at least one of an episode content, a channel identifier, a number of times the user changes channels, or a rate at which the user changes programming. The second information can include at least one of a uniform resource locator (URL), a web cookie, or programming-related advertisements.

Identifying the content can include identifying the content by comparing the first and the second information to stored values or identifying the content based on an overlap in information between the first and the second information. The content can include at least one of a feature or an advertisement. The feature or the advertisement can be related to programming. A third information about the user can be received by a second server, and the content to the first or second device can be provided based on the first, second, and third information. The third information can include at least one of a geographical location of the user, demographics of the user, or a number of computers in the user's household.

A second server can transmit the programming and the web page to a third device at the user's site, and the third device can send the television programming to the first device and the web page to the second device. The programming and the web page can be transmitted to a cable modem, a network router, or a set-top box. The first and second information can be received from the third device.

The television programming can be broadcast using at least one of a television over Internet protocol, National Television System Committee (NTSC) standard, Advanced Television Systems Committee (ATSC) standard, Digital Video Broadcasting (DVB) standard, or Integrated Services Digital Broadcasting (ISDB) standard.

In general, in another aspect, a computer-implemented method includes receiving a first information related to programming being viewed on a television and a second information related to a webpage that is being accessed through a computer. The television and the computer can be associated with a user. The computer-implemented method can also include delivering content to the television or the computer. The content can be determined based on an overlap of the first and second information or on a comparison of the first and second information to stored values.

In general, in another aspect, an apparatus includes a means for receiving a first information related to programming being viewed by a user on a first device and receiving a second information related to a web page being accessed through a second device. The first and second devices can be associated with the user. The apparatus can include storage storing rules can be used to identifying content based on the first and second information. The apparatus can include a means for delivering the content to the first or second device.

These and other aspects and features, and combinations of them, may be expressed as methods, apparatus, systems, means for performing functions, program products, and in other ways.

Advantages of the aspects and features include none, one or more of the following. Performance of an ad campaign can be improved by obtaining information related to television programming as well as to the web programming currently viewed by a user. On-line ads or features can be provided more accurately based on a matching between current television programming and current web programming. Television ads or features can be targeted more accurately based on a matching between current television programming and current web programming. The additional content provided by the system to the user can improve an experience of the user. More ad revenue can be generated for advertisers and publishers. A large number of ad campaigns can be analyzed and improved efficiently.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
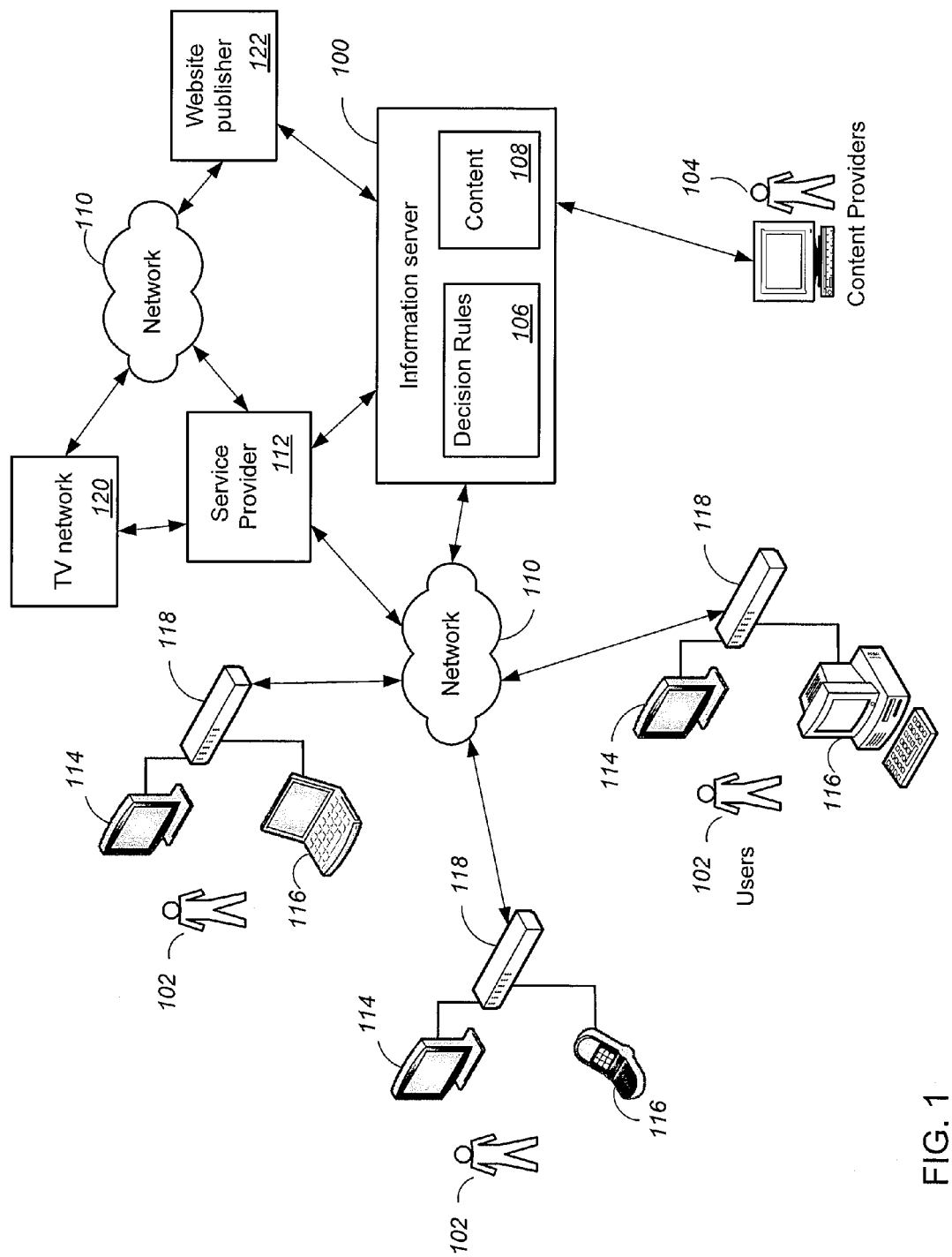
FIG. 1 is a schematic diagram of an example information system.

Referring to FIG. 1, an example of an information system 100 is shown for delivering television and web content to users 102. In some examples, television and web programming selected by a user 102 can both be delivered from a service provider 112 to a router 118 through a network 110. The TV programming can be delivered from a TV network 120 to the service provider 112 through the network 110. The TV programming can include programs selected by the user 102, for example, on a digital video recorder or through a pay-per-view channel. The web programming (e.g., a web page) can be delivered from a website publisher 122 to the service provider through the network 110. The website publisher 122 can host a website on a web server. The router 118 can be at the user's site (e.g., home or office). The router 118 allows programming (e.g., TV programming or web programming) sent from the service provider 112 to be delivered to the television 114. The router 118 also allows a computer 116 (e.g., a laptop, a desktop, a cell phone) to access web programming through the service provider 112. A connection between the router 118 and the computer 116 can be wireless or through a hardware connection.

In some examples, the programming can include any type of media (e.g., videos, images, movies, television shows, commercials, games) that the user 102 accesses through the router 118 and displays on the computer 116 or on the TV 114 (e.g., by using a digital visual interface (DVI) or a high-definition multimedia interface (HDMI) port). Alternatively or in addition, devices, such as a universal plug and play device (e.g., a Sony PlayStation® 3, a Microsoft® Xbox 360) can be connected to the computer 116 and displayed on the computer 116 or the TV 114. For example, the user 102 can use software programs (e.g., Google Media Server) to manage and stream programming from the computer 116 or from a website to the TV 114.

The information system 100 can include, e.g., a server computer. The system 100 can deliver content 108 (through the service provider 112 or through the website publisher 122) to a webpage that is viewed by the user 102 on the computer 116, in which the content 108 can be related to programming that is currently broadcast on the television 114. In some examples, the content 108 can appear on the television 114. The system 100 can provide additional content 108 based on decision rules 106 that use the information about the television and web programming that was provided to the system 100. The content 108 can be, for example, documents, images, or advertisements. The content 108 can be, for example, extra scenes, interviews, puzzles, games, or coupons.

In some examples, the website publisher 122 can reserve space for content on a website and can make a request (e.g., to the system 100) for content that has certain specified parameters. For example, the parameters can include none, one, or more of a keyword associated with the current TV programming, a demographic of the user 102 or of typical viewers of the current TV programming, or a location in which the user 102 resides. Content providers 104 can provide content 108 to the system 100, and, based on the information about the television and web programming, the system 100 can identify which of the content 108 supplied by the content providers 104 has the parameters specified by, for example, the website publisher 122. In some examples, the content providers 104 can make a request that a specific content 108 be provided to the user 102 when the TV programming and the web programming meet predefined criteria.

For example, the user 102 can be watching a TV show while accessing a web page. The system 100 can receive information related to the broadcast TV show and the accessed web page from the router 118 or the service provider 112. In this example, the provider 112 provides both web programming and TV programming to the router 118. The system 100 uses information about the broadcast TV programming and the accessed web page, and, in some implementations, other optional information about the user 102, to select and to provide the content 108, as explained in more detail below. The content 108 can be an ad that is provided to the accessed web page or extra scenes or interviews that can be stored in, e.g., a set-top box and viewed by the user 102 on the television 114 at a later time.

As described below, the information system 100 may gather information about the users 102, such as programming viewed by the users 102, in order to improve user experience, such as providing content that is more likely to be of interest to the users 102. It is important to protect privacy of the users 102. Preferably, the information system 100 follows a privacy protection policy to protect user privacy, and informs the users 102 about what information is collected by the system 100.

Information about current programming being viewed by the user 102 can be obtained, for example, by having a common router 118 to provide the user's television and Internet connections. The router 118 can communicate with the user's set-top box or digital recording device that provides TV signals to the television 114. In some implementations, the network router 118 can communicate with a server of the service provider 112 (e.g., Verizon or Comcast) and can provide information about what programming (e.g., TV programming or web programming) is being viewed on the television 114 and what web page is being viewed on the computer 116. Preferably, a privacy protection mechanism is provided to ensure that viewing history of users will not be linked to personally-identifying information.

The system 100 can deliver television programming using signals encoded according to, e.g., the television over Internet protocol, National Television System Committee (NTSC) standard, Advanced Television Systems Committee (ATSC) standard, Digital Video Broadcasting (DVB) standard, or Integrated Services Digital Broadcasting (ISDB) standard. The encoded signals can be delivered through, e.g., cable, satellite, or fiber optic channels. The router 118 can send the encoded signals to a set-top box that decodes the signals and generates video and audio signals that are provided to the television 114. The router 118 can send the encoded signals to the television 114 directly if the television has a built-in decoder. In some examples, the user can watch TV programming on a computer using a tuner card or by accessing a website that offers media that is similar to programs that are also broadcast on television.

The system 100 can deliver web programming to the router 118 through, e.g., cable, satellite, or fiber optic channels. The web programming can be sent, for example, according to TCP/IP protocol. The web programming can include, e.g., web pages, documents, and multimedia files.

Additional information, such as episode synopsis, demographics of the user 102, geographical location of the user 102, and the frequency with which the user changes channels, can also be used in the selection of the content 108 to be delivered to the computer 116 or the television 114. In some examples, a basic location detection technology such as one or more of GPS, assisted GPS, wireless network association, or cell phone tower triangulation can be used to determine a location of user 102 and associate the location with programming information (e.g., TV programming or web programming) and then render relevant content 108 on the user's computer or mobile phone. Preferably, a mechanism is provided to allow the users 102 to opt out of certain information collection. For example, a mechanism may be provided to allow users 102 to prevent location information from being provided to the information system 100.

Figure 2:
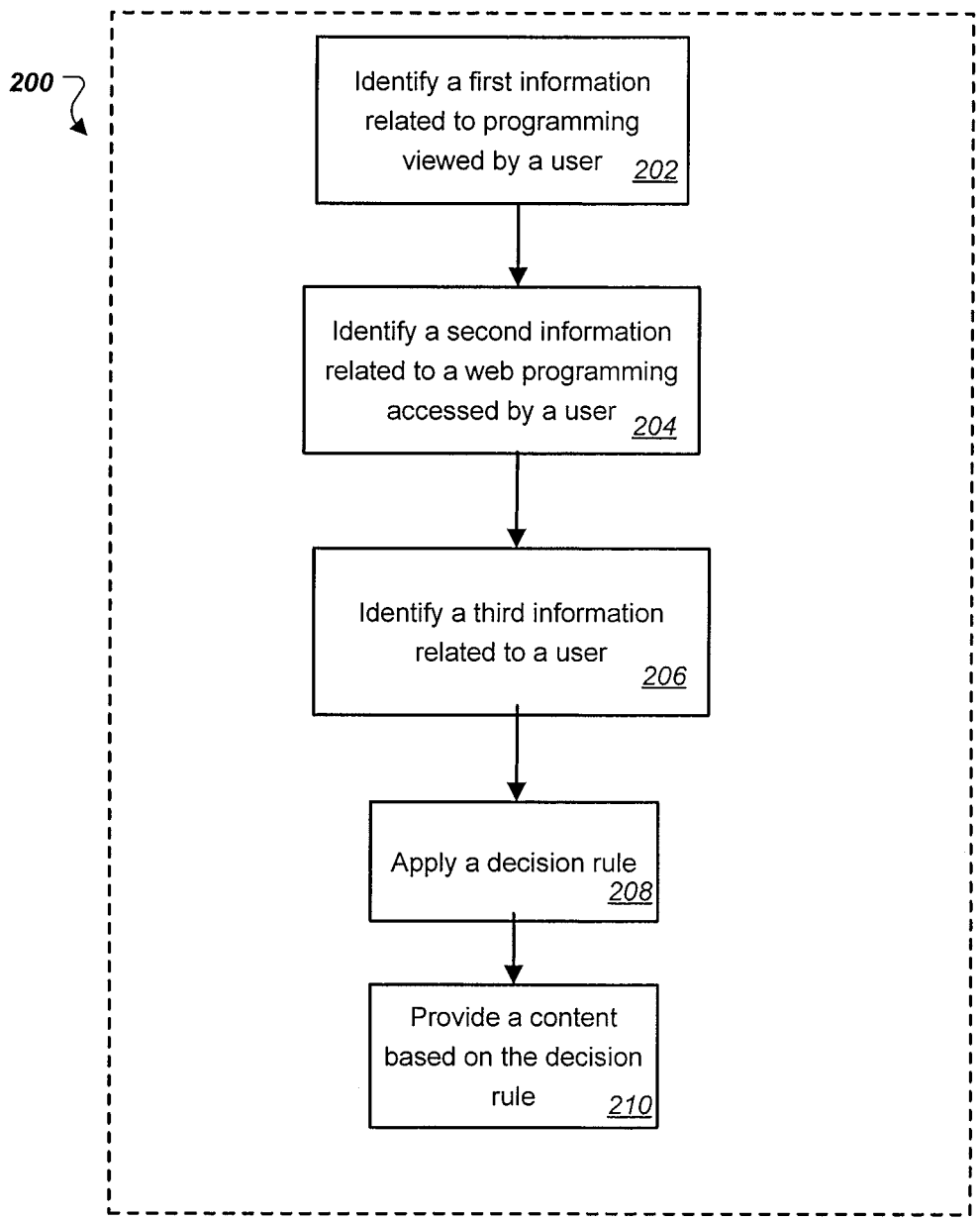
FIG. 2 is a flow diagram of an example process for providing content.

Referring to FIG. 2, a flowchart shows a process 200 that can be performed by the system 100 to provide the content 108. A first information is identified (202) that is related to programming (e.g., a movie, a sitcom, a video, a commercial) currently being viewed by the user 102. A second information is identified (204) that is related to web programming or a web page currently being viewed by the user 102. Optionally, a third information (e.g., demographics, location) is identified (206) that is related to the user 102. The third information can be provided, for example, from a result of a survey, from the service provider 112, or as an inference that is based on the demographics of typical viewers who also watch the television programming that the user is viewing. Next, a decision rule (e.g., as described in FIG. 3A or 3B) is applied (208) to the identified information to suggest (210) the content 108 to be provided (210) to the user 102.

Figure 3A:
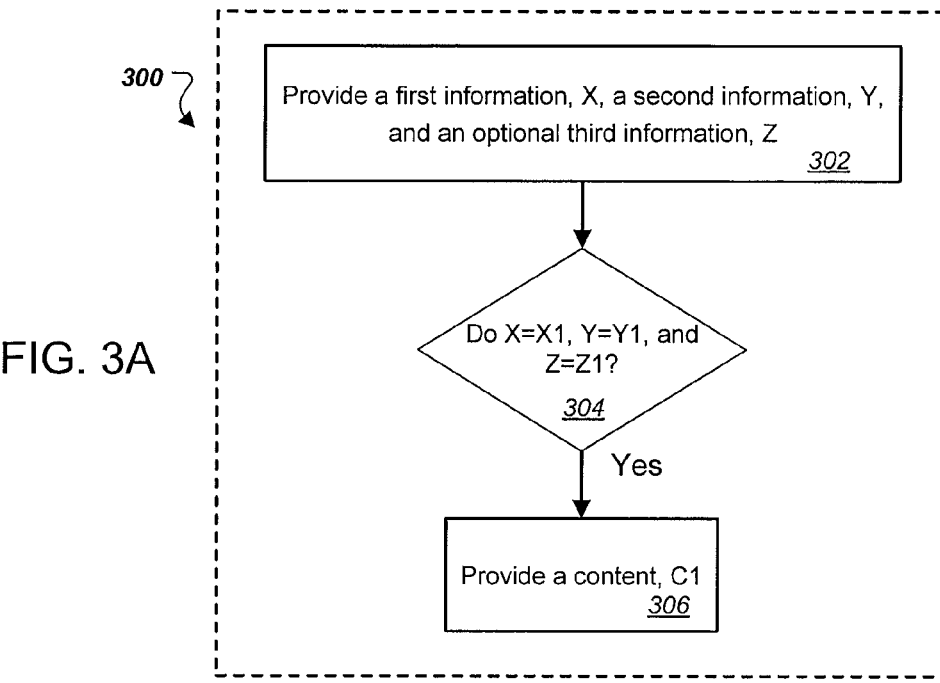
FIGS. 3A and 3B are example decision rules for providing content.

Referring to FIG. 3A, a decision rule 300 is shown in which a first information, X, and a second information, Y, are provided, and an optional third information, Z, is provided (302). Values of X, Y, and Z are compared to stored values, X1, Y1, and Z1 (304). The values can be stored, for example, in a database. If any or all of the provided values match the respective stored values, a content, C1, is provided (306). In some implementations, a third information is not provided.

In some implementations, the system 100 can select the content 108 to provide to the user 102 based on an overlap between a group of users who are watching a certain show on TV and a group of users who are viewing a certain web page. For example, the user 102 can be watching "Lost" on a television channel (e.g. Fox) while accessing a MySpace webpage. The router 118 can provide 302 a first information (e.g.; "Lost" on Fox) and a second information (e.g., a MySpace website URL) to system 100 directly through the network 110 or by way of the service provider 112. The system 100 can apply a decision rule (208), such as decision rule 300, in which the specific combination of "Lost" and "MySpace" causes a certain content to be provided to the user 102. For example, the provided content 108 can be links that appear within the viewed MySpace web page; these links, when clicked, can show, for example, a preview for the next episode of "Lost." In some implementations, an interaction of the user with a provided content on the computer can lead to an activity associated with TV programming. For example, a new web page can be displayed (e.g., on the computer screen or on the television) to show a provided content (e.g., extra scenes related to the TV programming) or to provide the user 102 the option of changing the television channel.

In some examples, the system 100 can receive information about the viewing habits of the user 102 and then provide content that relates to the viewing habits. For example, if the user 102 is frequently changing television channels between television channels that are airing similar programming, e.g., news broadcasts, the names of the programs or the program type can be reported to the system 100. If the user 102 is also viewing a web page, for example, checking email on a website (e.g., Yahoo Mail, Gmail), links can be provided on the web page that, when clicked, opens a new web page corresponding to a news sources (e.g., The BBC, The New York Times, The Boston Globe).

Figure 3B:
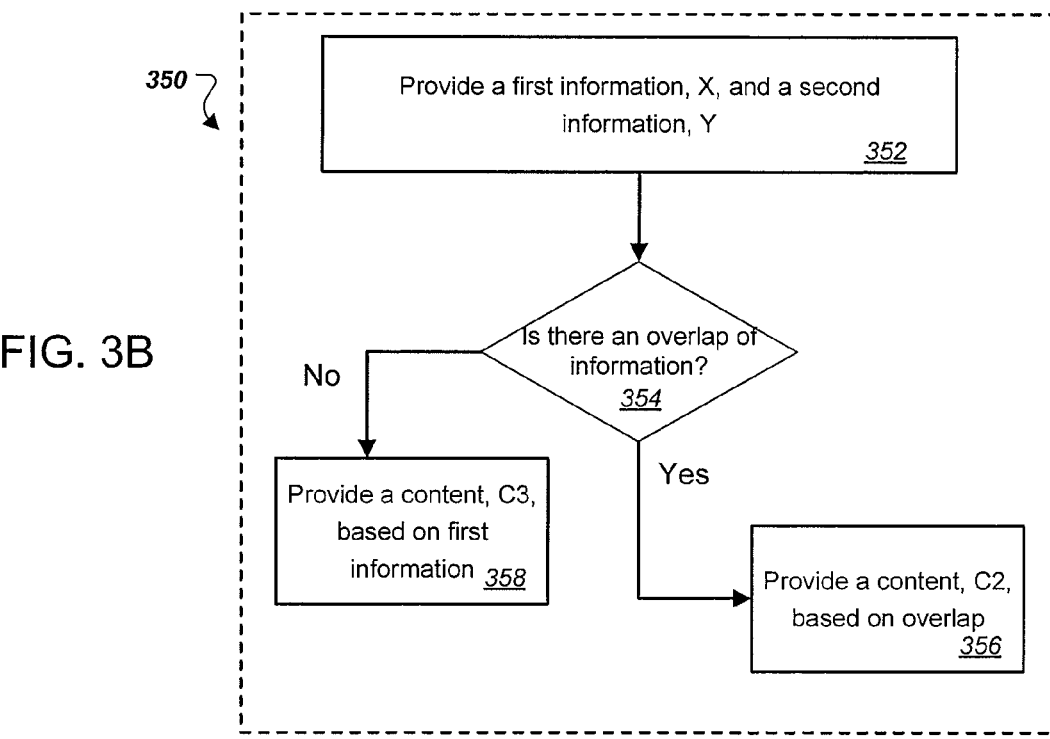

Referring to FIG. 3B, a decision rule 350 is shown in which a first information, X, and a second information, Y, are provided (352). It is determined (354) if there is an overlap of the information X and the information Y. An overlap in information can be a similar keyword or a similar group of keywords that is associated with both the information X and the information Y. For example, a keyword can appear in a web document, in a title or in a plot synopsis of a television show. If there is an overlap in information, a content C2 is provided (356). If no overlap in information is found, a content C3 is provided (358) that is based on the first information.

For example, a first information that is related to the programming on the TV 114 being viewed by the user 102 is provided (352). The first information can include, for example, at least one of an episode content, a channel identifier, or a frequency that the user 102 changes channels. A second information that is related to a web page being accessed through the computer 116 is also provided (352). The second information can include, for example, at least one of a uniform resource locator (URL), a web cookie, or a programming-related advertisement. An overlap (e.g., a common keyword) in the first and second information is determined (step 354) and a content 108 is provided (step 356) based on this overlap. A content (e.g., an ad, a feature) is provided 210 based on the selected keyword.

For example, if the user 102 is watching a travel program about Dubai while accessing a travel planning website (e.g., Travelocity, Orbitz, Priceline, Hotwire), links can be provided on the accessed web page that feature items related to Dubai. In some examples, if no overlap in information were found (e.g., the user 102 is accessing an ESPN website) content related to the first information (e.g., the travel program about Dubai) can be provided (358) to the accessed web page.

In some examples, in which a user 102 is watching a particular movie (e.g., a Harry Potter movie while accessing a Facebook website, a link can be provided that presents a feature, for example, that allows users to be prompted to solve some of the same puzzles solved by the characters in the movie. For example, if the user 102 follows the provided link and correctly completes the puzzles, special features, such as extra scenes, interviews, or movie or episode trailers, can be provided on the television 114 or the computer 116. For example, extra scenes from the movie can be provided on the television 114 (to be viewed at a later time) or a link to a YouTube website can be provided on the computer 116.

Figure 4:
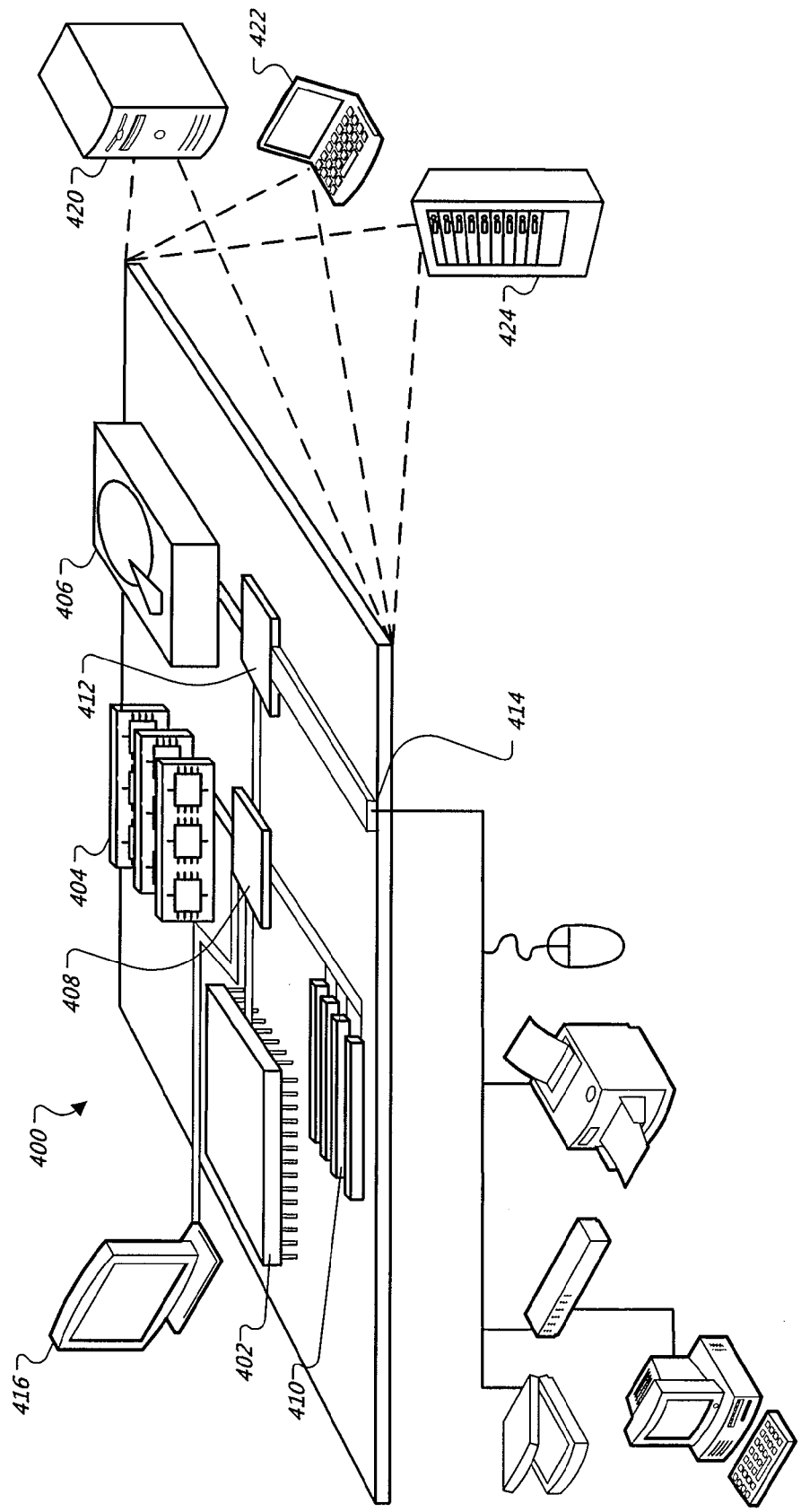
FIG. 4 is a diagram of an example computing device.

FIG. 4 is a schematic representation of a general computing system 400 that can be used to implement the system 100 or components of the system 100. Computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described or claimed in this document.

Referring to FIG. 4, the computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate.

The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Each of such devices (e.g., standard server, rack server system, personal computer, laptop computer) may contain one or more of computing device 400, and an entire system may be made up of multiple computing devices 400 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations and examples have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated.

Various types of user interfaces can be used to allow the content provider 104, the website publisher 122, and the user 102 to interact with the system 100.

In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving first information related to programming being displayed for a user of a first device;
receiving second information related to a web page being accessed by the user through a second device, while the programming is displayed on the first device;
applying a decision rule for detecting overlap between a first keyword in the first information that is related to programming being displayed for the user of the first device and a second keyword in the second information that is related to the web page being accessed by the user through the second device;
determining content for the user based on whether there is overlap between the first information that is related to programming being displayed for the user of the first device and the second information that is related to the web page being accessed by the user through the second device, the determining comprising:
determining first content for the user when there is overlap between the first information and the second information; and
determining second content for the user when there is no overlap between the first information and the second information, wherein the second content is based on the first information;
retrieving the determined content; and
as the programming is being displayed and as the web page is being accessed:
transmitting the determined content to the first device for display or to the second device for real time display on the web page.

2. The computer-implemented method of claim 1, wherein the first device comprises a television, a computer, or a video game console.

3. The computer-implemented method of claim 1, wherein the second device comprises a computer or a cell phone.

4. The computer-implemented method of claim 1, wherein the programming comprises at least one of a video, an image, a movie, a game, or a television show.

5. The computer-implemented method of claim 1, wherein the first information comprises at least one of an episode content, a channel identifier, a number of times a user of the first device or the second device changes channels, or a rate at which the user changes programming.

6. The computer-implemented method of claim 1, wherein the second information comprises at least one of a uniform resource locator (URL), a web cookie, or programming-related advertisements.

7. The computer-implemented method of claim 1, wherein the determined content is determined by comparing the first and the second information to stored values.

8. The computer-implemented method of claim 1, wherein the determined content comprises at least one of a feature or an advertisement.

9. The computer-implemented method of claim 8, wherein the feature or the advertisement is related to the programming.

10. The computer-implemented method of claim 1, further comprising:
receiving third information about the user; wherein retrieving the determined content comprises:
retrieving the determined content based on the first, second, and third information.

11. The computer-implemented method of claim 10, wherein the third information comprises at least one of a geographical location of the user, demographics of the user, or a number of computers in the user's household.

12. The computer-implemented method of claim 1, wherein a third device is configured to transmit the programming to the first device and to transmit the web page to the second device.

13. The computer-implemented method of claim 12, wherein the third device comprises at least one of a cable modem, a network router, or a set-top box.

14. The computer-implemented method of claim 12, wherein receiving the first and second information comprises receiving the first and second information from the third device.

15. The computer-implemented method of claim 1, wherein the programming is broadcast using at least one of an Internet protocol, a National Television System Committee (NTSC) standard, an Advanced Television Systems Committee (ATSC) standard, a Digital Video Broadcasting (DVB) standard, or an Integrated Services Digital Broadcasting (ISDB) standard.

16. The computer-implemented method of claim 1, wherein the determined content comprises at least one of a television program, a video, a game, an advertisement, or a web page.

17. A system comprising:
a server configured to perform operations comprising:
receiving first information related to programming being displayed for a user of a first device;
  receiving second information related to a web page being accessed by the user through a second device, while the programming is displayed on the first device;
  applying a decision rule for detecting overlap between a first keyword in the first information that is related to programming being displayed for the user of the first device and a second keyword in the second information that is related to the web page being accessed by the user through the second device;
  determining content for the user based on whether there is overlap between the first information that is related to programming being displayed for the user of the first device and the second information that is related to the web page being accessed by the user through the second device, the determining comprising:
  determining first content for the user when there is overlap between the first information and the second information; and
  determining second content for the user when there is no overlap between the first information and the second information, wherein the second content is based on the first information; retrieving the determined content; and
  as the programming is being displayed and as the web page is being accessed:
  transmitting the determined content to the first device for display or to the second device for real time display on the web page.

18. The system of claim 17, wherein the first device comprises a television, a computer, or a video game console.

19. The system of claim 17, wherein the second device comprises a computer or a cell phone.

20. The system of claim 17, wherein the first information comprises at least one of an episode content, a channel identifier, a number of times a user of the first device or the second device changes channels, or a rate at which the user changes programming.

21. The system of claim 17, wherein the second information comprises at least one of a uniform resource locator (URL), a web cookie, or programming-related advertisements.

22. The system of claim 17, wherein the determined content is determined by comparing the first and the second information to stored values.

23. The system of claim 17, wherein the determined content comprises at least one of a feature or an advertisement.

24. The system of claim 23, wherein the feature or the advertisement is related to the programming.

25. The system of claim 17, wherein the operations further comprise: receiving third information about a user of one or more of the first device and the second device;
  wherein retrieving the determined content comprises:
  retrieving the determined content based on the first, second, and third information.

26. The system of claim 25, wherein the third information comprises at least one of a geographical location of the user, demographics of the user, or a number of computers in the user's household.

27. The system of claim 17, wherein
a third device is configured to transmit the programming to the first device and the web page to the second device.

28. The system of claim 27, wherein the third device comprises at least one of a cable modem, a network router, or a set-top box.

29. The system of claim 27, wherein receiving the first and second information comprises receiving the first and second information from the third device.

30. The system of claim 17, wherein the programming is broadcast using at least one of an Internet protocol, a National Television System Committee (NTSC) standard, an Advanced Television Systems Committee (ATSC) standard, a Digital Video Broadcasting (DVB) standard, or an Integrated Services Digital Broadcasting (ISDB) standard.

31. An apparatus comprising:
means for receiving first information related to programming being displayed for a user of a first device and receiving second information related to a web page being accessed by the user through a second device, while the programming is displayed on the first device;
means for applying a decision rule for detecting overlap between the first information that is related to programming being displayed for the user of the first device and the second information that is related to the web page being accessed by the user through the second device;
means for determining content for the user based on whether there is overlap between a first keyword in the first information that is related to programming being displayed for the user of the first device and a second keyword in the second information that is related to the web page being accessed by the user through the second device, wherein determining content comprises:
  determining first content for the user when there is overlap between the first information and the second information; and
  determining second content for the user when there is no overlap between the first information and the second information, wherein the second content is based on the first information;
means for retrieving the determined content; and
means for transmitting the determined content to the first device for display or to the second device for real time display on the web page, as the programming is being displayed and as the web page is being accessed.

32. One or more non-transitory machine-readable media configured to store instructions that are executable by one or more processing devices to perform operations comprising:
- receiving first information related to programming being displayed for a user of a first device;
- receiving second information related to a web page being accessed by the user through a second device, while the programming is displayed on the first device;
- applying a decision rule for detecting overlap between a first keyword in the first information that is related to programming being displayed for the user of the first device and a second keyword in the second information that is related to the web page being accessed by the user through the second device;
- determining content for the user based on whether there is overlap between the first information that is related to programming being displayed for the user of the first device and the second information that is related to the web page being accessed by the user through the second device, the determining comprising:
- determining first content for the user when there is overlap between the first information and the second information; and
- determining second content for the user when there is no overlap between the first information and the second information, wherein the second content is based on the first information;
- retrieving the determined content; and
- as the programming is being displayed and as the web page is being accessed:
- transmitting the determined content to the first device for display or to the second device for real time display on the web page.

33. The one or more non-transitory machine-readable media of claim 32, wherein the first device comprises a television, a computer, or a video game console.

34. The one or more non-transitory machine-readable media of claim 32, wherein the second device comprises a computer or a cell phone.

35. The one or more non-transitory machine-readable media of claim 32, wherein the programming comprises at least one of a video, an image, a movie, a game, or a television show.

36. The one or more non-transitory machine-readable media of claim 32, wherein the first information comprises at least one of an episode content, a channel identifier, a number of times a user of the first device or the second device changes channels, or a rate at which the user changes programming.

37. The one or more non-transitory machine-readable media of claim 32, wherein the second information comprises at least one of a uniform resource locator (URL), a web cookie, or programming-related advertisements.

38. The one or more non-transitory machine-readable media of claim 32, wherein the determined content is determined by comparing the first and the second information to stored values.

39. The one or more non-transitory machine-readable media of claim 32, wherein the determined content comprises at least one of a feature or an advertisement.

40. The one or more non-transitory machine-readable media of claim 39, wherein the feature or the advertisement is related to the programming.

41. The one or more non-transitory machine-readable media of claim 32, wherein the operations further comprise:
- receiving third information about a user of one or more of the first device and the second device;
- wherein retrieving the determined content comprises:
- retrieving the determined content based on the first, second, and third information.

* * * * *